United States Patent [19]

Collins et al.

[11] Patent Number: 5,531,849

[45] Date of Patent: Jul. 2, 1996

[54] METHOD OF MANUFACTURING CARPED PADS

[76] Inventors: Burley B. Collins, 1312 John McCain, Colleyville, Tex. 76034; Miller D. Collins, 13919 Sugarberry Wds., San Antonio, Tex. 78249

[21] Appl. No.: 384,823

[22] Filed: Feb. 7, 1995

[51] Int. Cl.$^6$ ....................................................... B32B 5/18
[52] U.S. Cl. ...................... 156/78; 156/209; 156/220; 156/243; 156/269; 156/307.1; 264/46.2; 264/284; 264/321
[58] Field of Search ............................ 156/78, 209, 219, 156/220, 269, 79, 220, 243, 307.1; 264/46.5, 46.2, 45.8, 284, 321; 428/304.4, 319.7, 319.9

[56] References Cited

U.S. PATENT DOCUMENTS

| | | | |
|---|---|---|---|
| 3,172,072 | 3/1965 | Willy | 428/317.1 |
| 3,576,706 | 4/1971 | Baumann et al. | 428/317.1 |
| 3,654,063 | 4/1972 | Blackburn et al. | 428/304.4 |
| 4,336,089 | 6/1982 | Asperger | 156/152 |
| 4,411,949 | 10/1983 | Snider et al. | 156/78 |
| 4,797,170 | 1/1989 | Hoopengardner | 156/71 |
| 5,045,389 | 9/1991 | Campagna | 428/316.6 |
| 5,264,167 | 11/1993 | Proksa et al. | 264/46.2 |

FOREIGN PATENT DOCUMENTS

| | | |
|---|---|---|
| 842267 | 9/1952 | Germany . |
| 2836967 | 2/1980 | Germany . |
| 54-108865 | 8/1979 | Japan . |

Primary Examiner—Michael W. Ball
Assistant Examiner—Richard Crispino
Attorney, Agent, or Firm—Charles D. Gunter, Jr.

[57] ABSTRACT

A method of manufacturing a carpet pad and the apparatus for the same are shown. A frame is provided to which is mounted a conveyor belt. The conveyor belt feeds a first liner sheet along a conveyor path from a forward end to a rearward end. A foam spray assembly is connected to an uncured polymeric foam supply having a spray nozzle mounted adjacent to the forward end of the conveyor path. The spray nozzle dispenses uncured, resilient polymeric foam as a generally uniform layer on a surface of the first liner sheet. A second conveyor belt mounted to the frame is located along the conveyor path and spaced apart from the second conveyor belt a selected distance. The second conveyor belt is parallel to the first conveyor belt and feeds the second liner sheet along the conveyor path so that the second liner sheet is positioned over the layer of foam. As the layer of foam passes along the conveyor path, the foam material is sandwiched between the first and second liner sheets and is compressed between the conveyor belts to a selected thickness. This laminated foam is then heated. A heated air supply supplies air which is introduced inside a heat cover for curing of polymeric foam as it is compressed between the conveyor belts with the first and second liner sheets adhering to the foam material as it is cured.

21 Claims, 6 Drawing Sheets

METHOD OF MANUFACTURING CARPED PADS

BACKGROUND OF THE INVENTION

1. Field of the Invention

This invention relates to a method of manufacturing padding for underlying a carpet floor covering and an apparatus for performing the same.

2. Description of the Prior Art

Padding material for use with carpeting usually consists of a sheet or layer of polymeric foam material which acts as a cushion to enhance the resiliency and feel of the carpet. Carpet pads usually consist of re-bond material which is formed from small pieces of foam which are bonded together to form a sheet or layer. Typically, the re-bond padding material is used as is with only a single liner sheet or laminate. With heavy foot traffic, the foam material of these pads tends to degrade and deteriorate. These carpet pads also tend to absorb and retain liquids which are spilled and soak through the overlying carpet.

Carpet pads made from polyurethane foam have been manufactured as an alternative to these re-bond carpet pads. The polyurethane pads are more durable and are usually provided with a single polyethylene liner sheet bonded to one side of the foam. The liner sheet serves solely for allowing the carpet to slide easily over the pad during installation. Typically, the liner sheet is bonded to the foam material by applying pressure and heat after the polyurethane foam has already been cured. Because the application of heat and pressure to the polyurethane foam after it has been cured can adversely affect its properties, improvements are needed in manufacturing these carpet pads.

SUMMARY OF THE INVENTION

A method of manufacturing padding material for underlying a carpet floor covering is accomplished by feeding a first liner sheet along a conveyor path. An amount of uncured, resilient polymeric foam material is then deposited on the first liner sheet as the first liner sheet is fed along the conveyor path so that the foam material is spread as a generally uniform layer over a surface of the first liner sheet. A second liner sheet is then positioned over the layer of polymeric foam material as the first liner sheet is fed along the conveyor path so that the layer of foam material is sandwiched between the first and second liner sheets. The sandwiched layer of foam material is then fed along the conveyor path between a pair of opposite facing parallel conveyor belts. The conveyor belts are spaced apart so that the sandwich layer of polymeric foam material is compressed to a selected uniform thickness. The compressed layer of polymeric foam material is then heated so that the foam material is cured with the first and second sheets adhering to the foam material to form a foam laminate.

An apparatus for carrying out the method of the invention is also provided. The apparatus has a frame to which a first conveyor belt is mounted for feeding a first liner sheet along a conveyor path from a forward end to a rearward end. A foam spray assembly is connected to an uncured polymeric foam supply and has a spray nozzle mounted adjacent to the forward end of the conveyor path. The spray nozzle dispenses uncured, resilient polymeric foam as a generally uniform layer on the surface of the first liner sheet as it is moved along the conveyor path. A second conveyor belt is also mounted to the frame and is located along the conveyor path and spaced apart a selected vertical distance from the first conveyor belt. The second conveyor belt is parallel to the first conveyor belt and feeds a second liner sheet along the conveyor path parallel to the first liner sheet so that the second liner sheet is positioned over the layer of foam as it is moved along the conveyor path. Movement of the first and second liner sheets and dispensed foam along the conveyor path forms a sandwiched layer of foam material with the first and second conveyor belts compressing the sandwiched layer of foam material to a selected thickness as it is moved along the conveyor path. A heat cover surrounds the first and second conveyor belts and is connected to heat source, such as a heated air supply for introducing heated air within the heat cover. Passage of the liner sheets and foam material through the heat cover cures the polymeric foam material as it is compressed between the conveyor belts so that the foam material is cured and the first and second sheets adhere to the foam material to form a foam laminate.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
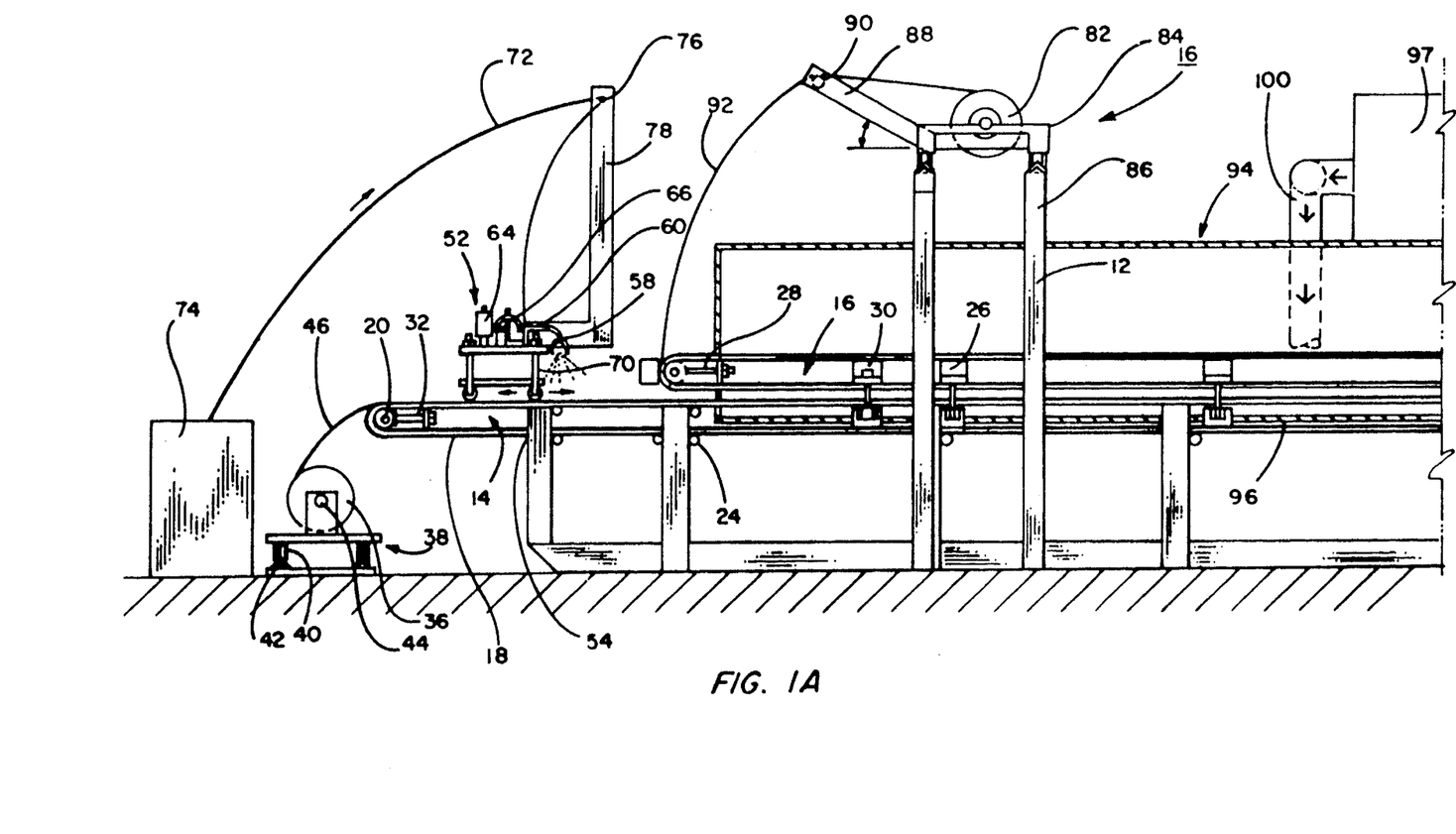
FIGS. 1A–1C are elevational side views of an apparatus used in carrying out the method of the invention, FIG. 1B being a continuation of FIG. 1A and FIG. 1C being a continuation of FIG. 1B.
Figure 1B:
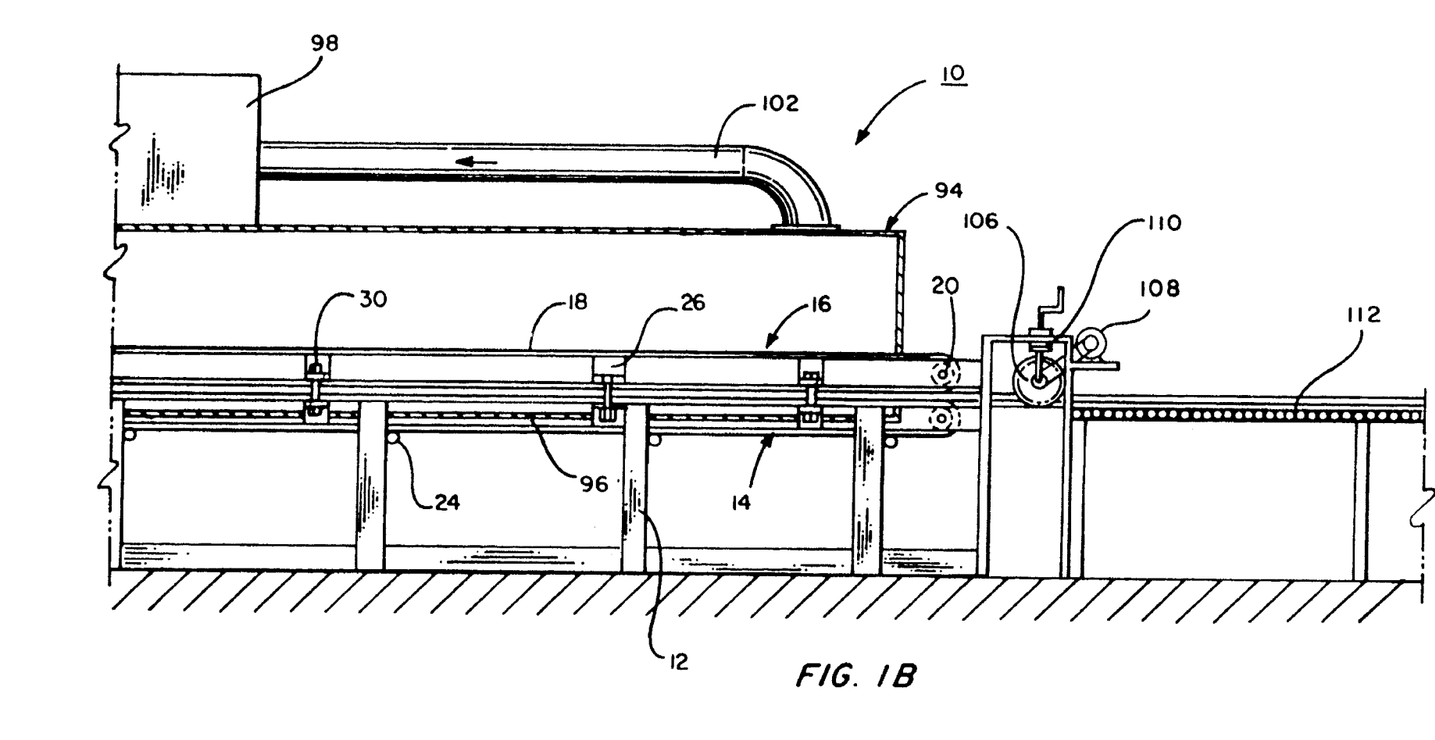
Figure 1C:
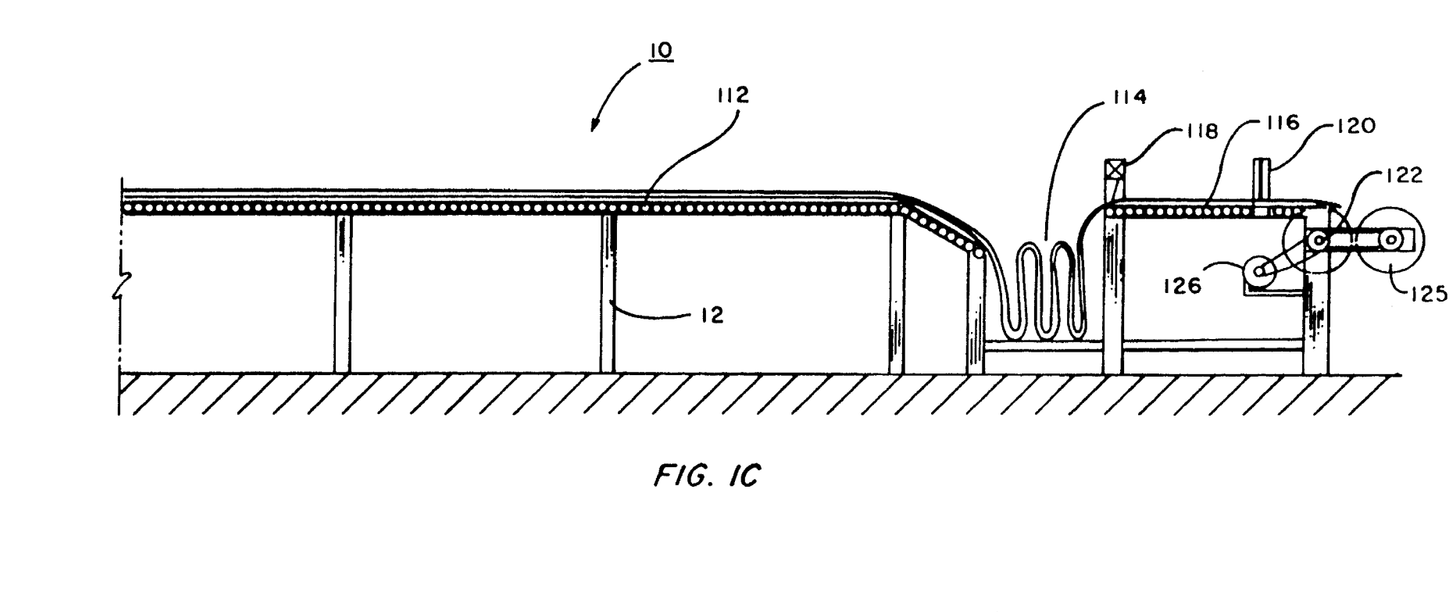
Figure 2:
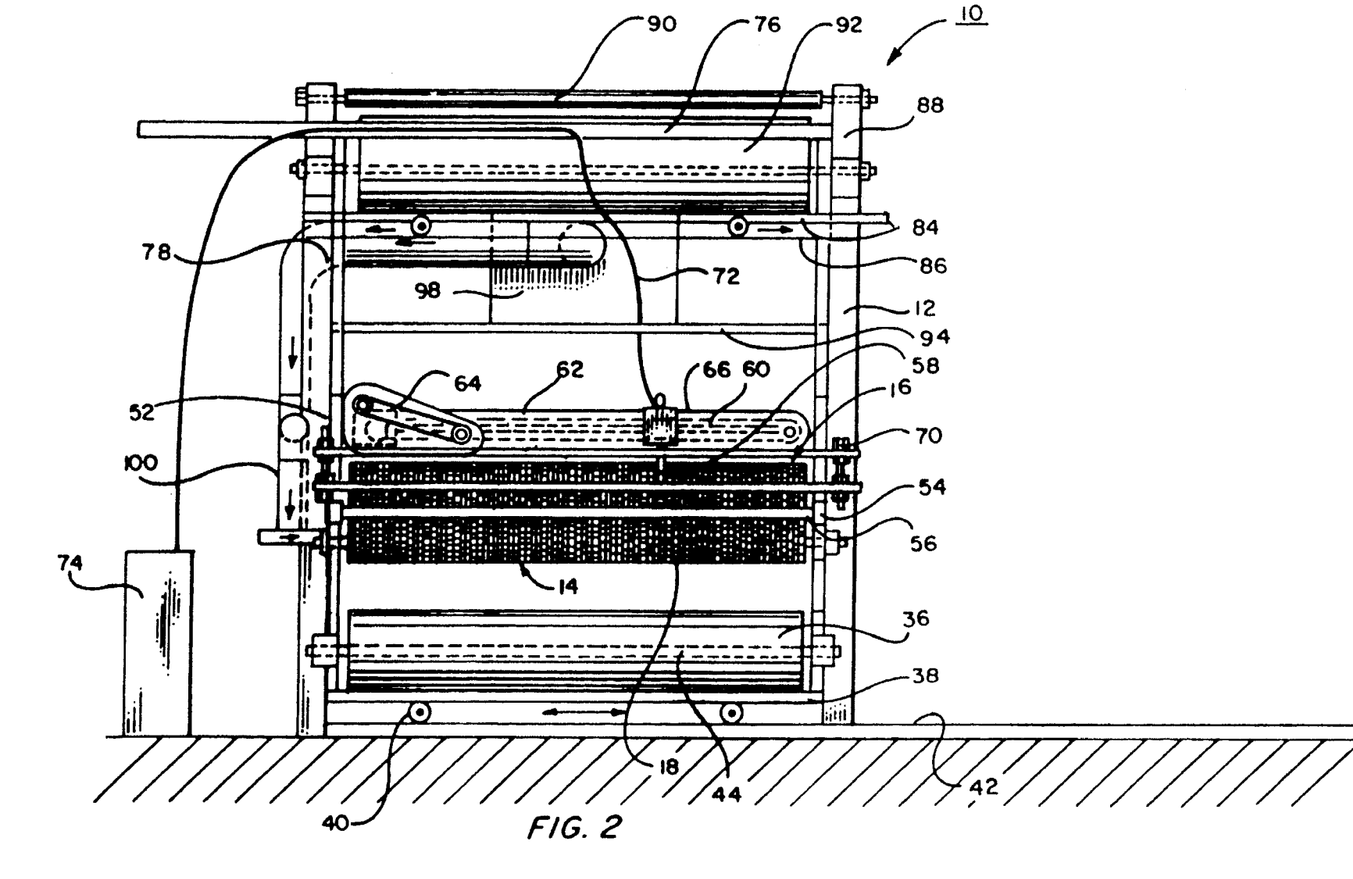
FIG. 2 is a front elevational view of the apparatus of FIGS. 1A–1C.
Figure 3:
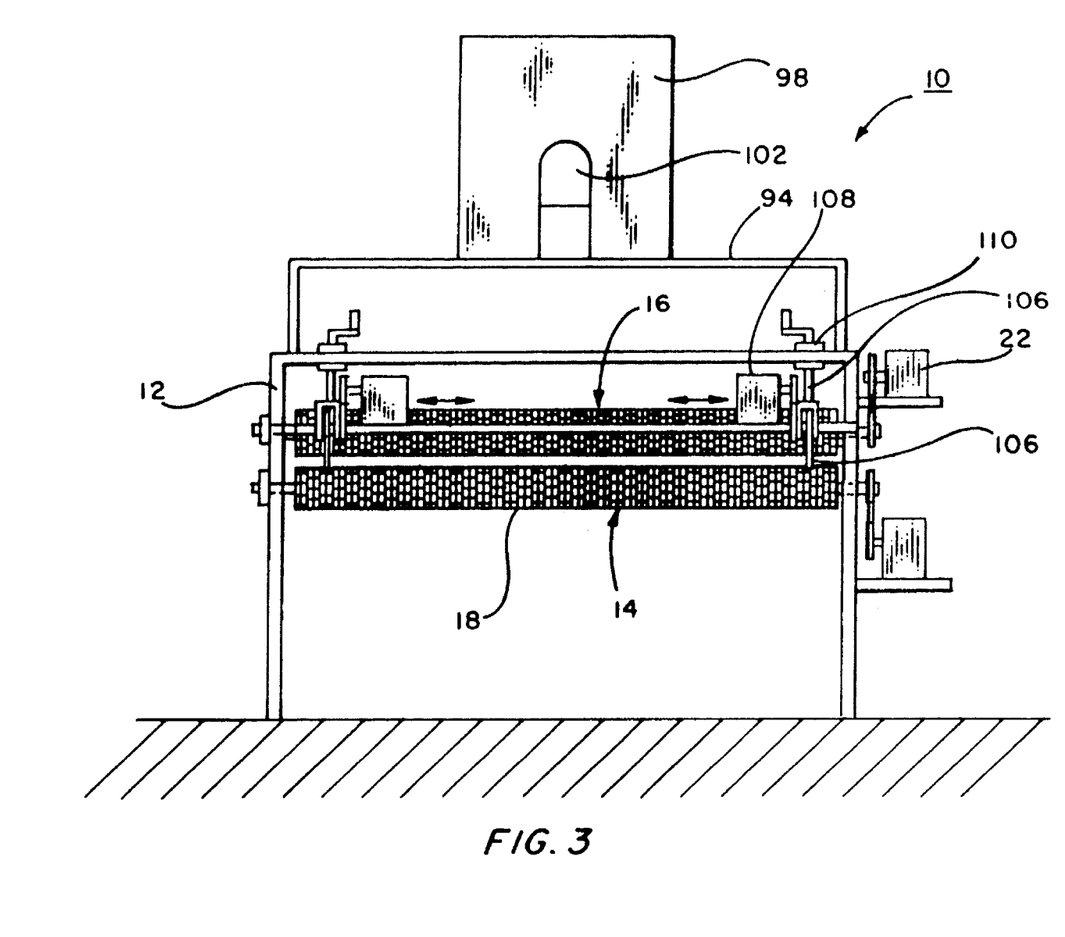
FIG. 3 is a rear elevational view of the apparatus of FIGS. 1A–1C.

Padding material for underlying a carpet floor covering is produced in a generally continuous fashion as it is moved along a conveyor path using the apparatus 10, as shown in FIGS. 1–3. Referring to FIGS. 1A–1C, the various components of the apparatus 10 are housed and carried by means of a framework 12. The framework 12 supports a lower conveyor 14 and an upper conveyor 16 which provide the primary means for transporting the padding material along the conveyor path as it is processed. The lower and upper conveyors 14, 16 are each constructed similarly and are comprised of a conveyor belt 18 (FIG. 2), which is a continuous chain-link belt of woven wire, mounted about sprockets 20. A suitable chain-link belt is that used with a 6-inch sprocket having 19 sprockets per shaft. As seen in FIG. 3, the sprockets 20 located at the rearward end of each conveyor 14, 16 are rotatably driven by electric motors 22. The sprockets 20, in turn, drive the conveyor belts 18 of each of the lower and upper conveyors 14, 16.

The chain-link belts 18 of the conveyors 14, 16 are supported by transverse rollers 24 and stabilizers 26 spaced at intervals along the length of each conveyor 14, 16. Tension on the conveyor belts 18 of the conveyors 14, 16 is maintained by longitudinal chain adjustment screws 28 located at the forward end of the conveyors 14, 16 for longitudinally extending or retracting the forward sprockets 20 so that slack is taken out of the conveyor belts 18. By means of the rollers 24, stabilizers 26 and tensioning screws 28, the lower surface of the upper conveyor 16 and the upper surface of the lower conveyor 14 are maintained as generally flat, even surfaces.

The lower and upper conveyors 14, 16 are spaced apart a selected vertical distance which can be varied by means of vertical adjustment screws 30. The adjustment screws 30 are conveniently spaced at various selected points along the length and on each side of the conveyors 14, 16. The adjustment screws 30 raise and lower the upper conveyor 16 relative to the lower conveyor 14, which remains stationarily fixed to the framework 12. As seen in FIGS. 2 and 3, the lower surface of the conveyor belt 18 of the upper conveyor 16 is substantially parallel to the upper surface of the lower conveyor 14.

Referring to FIG. 1A, the lower conveyor 14 extends forward several feet beyond the forward end of the upper conveyor 16. Located at the forward end of the lower conveyor 14 is a lower liner supply roll 36 which is mounted on a trolley 38. The trolley 38 is provided with wheels 40 which rest on a pair of rails 42 which allow the trolley 38 to be moved laterally away from the apparatus 10 so that the supply rolls can be easily changed by means of a fork lift or other means. The trolley 38 and supply roll 36 can then be moved into alignment with the conveyors 14, 16.

The lower supply roll 36 is mounted on a roll shaft 44 which is transverse to the direction of movement of the lower conveyor 14. The lower supply roll 36 supplies a generally continuous length of liner sheet 46 which is fed to the upper surface of the lower conveyor 14. The liner sheet 46 can be selected from a number of flexible synthetic materials which are suitable for forming a laminate with the foam material. The preferred material for the liner sheet 46 is single layer film of low density polyethylene having a generally uniform thickness ranging from about 0.5 to 1 mil.

Mounted above the lower conveyor 14, adjacent to the forward end, is a spray assembly 52 which is mounted on wheels 54. The wheels 54 rest on tracks 56 of the frame 12 on either side of the lower conveyor 14 to allow longitudinal positioning of the spray assembly 52 over the lower conveyor 14. The spray assembly 52 is provided with a spray nozzle 58 mounted to a transverse slide bar 60 (FIG. 2). The spray nozzle 58 is movable back and forth along the transverse slide bar 60 by means of a continuous roll chain 62 which is driven by an electric motor 64. A chain guard 66 covers the roll chain 62. The spray assembly 52 can be raised or lowered to vary the height of the spray nozzle 58 from the upper surface of the lower conveyor 14 by means of adjustment screws 70 located on either side of the lower conveyor 14.

A foam supply hose 72 connects the spray nozzle 58 with a foam metering system 74 for metering components of polyurethane foam used in the manufacture of the carpet padding. The foam metering equipment 74 is of conventional design and can be any such equipment known to those skilled in the art for producing polyurethane foam suitable for the manufacture of carpet padding. A suitable foam metering system is that marketed as the "Gusmer M-2000" foam equipment. The foam hose 72 is supported by means of a hose support 76 which is suspended over the lower conveyor 14 and spray assembly 52 by means of an arm 78 of the framework 12. A limited amount of slack is provided in the hose 72 to prevent the hose 72 from interfering with the movement of the spray assembly 52 or spray nozzle 58.

Suspended above the upper conveyor 16 is an upper liner supply roll 82 which is supported on a trolley 84, similar to the trolley 38. The upper trolley 84 rests on a trolley support 86 of the frame 12 to allow lateral movement of the trolley 84 for easy access and changing of the supply roll 82. The trolley 84 is provided with a pair of laterally spaced apart, forward extending arms 88 which carry a transverse roller 90. An upper liner sheet 92 supplied from the upper liner supply roll 82 is fed over the roller 90 to the forward end of the upper conveyor 16 so that it engages the lower surface of the upper conveyor 16.

A heat cover 94 is mounted to the framework 12. The heat cover 94 is formed from approximately one-inch thick insulating sheet material. The heat cover 94 extends substantially along the entire length of the upper conveyor 16 and is generally configured to surround the lower and upper conveyors 14, 16 with the lower wall 96 of the heat cover 94 being located between the upper and lower portions of the conveyor belt 18 of the lower conveyor 14. Heated air is introduced into the heat cover 94 by means of an air heater 98 consisting of a blower and heating element (not shown) for heating air and discharging it into a heat discharge manifold 100. The heat cover 94 is provided with a number of vents or openings (not shown) which are located along the length of the heat cover 94 adjacent to the upper and lower conveyors 14, 16. The vents or openings communicate with the discharge manifold 100 so that heated air is directed generally along the entire length of the lower and upper conveyors 14, 16. A heat return duct 102 is also provided at the rearward end of the heat cover 94, as shown in FIG. 1B. The heat return duct 102 is connected to an intake of the heater 98 for recirculating heated air exhausted from the heat cover 94.

Located to the rear of the lower and upper conveyors 14, 16 are a pair of trim saws 106 which are laterally spaced apart a selected distance. The trim saws 106 are radial-type saws which are parallel to each other and oriented vertically for trimming the edges of the carpet padding as it is moved along the conveyor path from the lower and upper conveyors 14, 16. The trim saws 106 are each driven by an electric motor 108, as shown in FIG. 3. Saw adjusters 110 allow the trim saws 106 to be positioned both vertically, to various depths, and laterally inward or outward, depending upon the width of the carpet padding desired.

Located to the rear of the trim saws 106 is a roller table 112 which extends rearward several feet to a holding stage 114. The holding stage 114 is essentially a box or bin for collecting carpet padding as it is fed from the trim saws 106 to provide an area of slack as the carpet padding is further processed downstream. Located immediately adjacent to the rear of the holding stage 114 is a second roller table 116. The second roller table 116 is provided with a mechanical counter 118 which counts a preselected length of the carpet padding as it is fed from the holding stage 114 to a transverse cut-off shear 120. The cut-off shear 120 cuts the carpet padding to the desired length after the counter has counted the preselected number of feet. Rollers 122 for packaging the cut carpet padding are provided to the rear of the cutoff shear 120 and are powered by a motor 126. The rollers 122 reel the carpet padding into rolls 125 for storage and eventual shipping and use.

The carpet padding is produced as follows. First, the lower liner sheet 46 is fed from the supply roll 36 mounted on the trolley 38 to the upper surface of lower conveyor 14. Initially, it may be necessary to hand feed the lower liner sheet 46 or otherwise secure the liner sheet 46 to the lower conveyor so that the liner 46 is fed to the spray assembly 52.

As the motors 22 rotate rear sprockets 20, the chain conveyor belt 18 of each conveyor 14, 16 is continuously driven to provide a conveyor path along which the carpet padding is formed and transported. As shown in FIG. 1A–1C, the direction of the conveyor path is from left to right, beginning at the forward end of the lower conveyor 14 and ending at the roller 122 where the carpet padding is collected. The conveyor speed may vary but is usually between 10 to 20 feet per minute. As the lower liner sheet 46 is fed by the lower conveyor 14, components of the foam used in manufacturing the carpet padding are fed from the foam metering system 74 through the hose 72 to the spray nozzle 58 of the spray assembly 52.

The polyurethane foam used for the carpet padding is formed by the reaction of polyols with di-or poly-isocyanates, as will be generally familiar to those skilled in the art. These components are metered by means of the metering equipment 74, which also meters the catalysts, surfactants, color additives, and water with the polyol and isocyantes, to produce a high resiliency, open cell polyurethane foam. The isocyanate component is preferably supplied by 4,4'diphenylmethane diisocyanate (MDI) and polymeric MDI. The polyols may be either hydroxyl-terminated polyethers or hydroxyl terminated polyesters. A suitable polyol is that marketed as "B Side System Resin (Flexible)" available from AM & Associates, Huntington Beach, Calif. The polyols are typically capped, for example with ethylene oxide, to give a high resiliency foam. Suitable catalysts used for forming the polyurethane foam include amine catalysts, such as triethylenediamine and bis(dimethylaminoethyl-)ether or blends thereof. Amounts of organotin catalysts may also be used. A silicone surfactant is also used. It is within the scope of the invention that a variety of formulations could be used to provide a suitable polyurethane foam or equivalent to form the carpet padding using the method of the invention. Because the methods for formulating polyurethane foam are widely known to those skilled in the art, they are not described in detail herein.

The polyol and isocyanate components from the metering system 74 react upon being dispensed from the spray nozzle 58 of the spray assembly 52. The spray nozzle may be positioned at a variety of heights above the lower liner sheet 46 to provide a suitable spray pattern. Preferably, the spray nozzle 58 dispenses a pattern of foam approximately 6 to 7 inches wide. In order to provide a generally uniform layer of foam on the lower liner sheet 46, the spray nozzle 58 is reciprocated back and forth along the transverse slide bar 60 by means of the motor 64 and chain 62 as the lower liner sheet 46 is fed along the conveyor path. The rate of movement of the spray nozzle 58 may have to be adjusted based upon the amount of foam dispensed and the dimensions of the spray pattern. The spray patterns dispensed by the spray nozzle 58 should touch or overlap so that the whole surface of the liner sheet 46 is completely covered with as it is moved along the conveyor path. The amount of foam deposited should be enough to provide a layer of free rise polyurethane foam having a density of approximately 2.5 pounds per cubic foot without being compressed or molded. The final density of the foam of the carpet padding will be higher, however, due to the subsequent molding process which is later described.

As the foam is applied to the surface of the liner sheet 46, the foam will begin to expand. As this is happening, the second or upper liner sheet 92 is positioned and applied to the foam layer as it reaches the forward end of the upper conveyor 16. The lower and upper conveyors 14, 16 are spaced apart a distance of between about ¼ to 9/16 of an inch, with about ⅜ to ½ inch being preferred. This molds the foam layer so that the polyurethane foam is compressed to a density of approximately 6.0 pounds per cubic foot. The space between the lower and upper conveyors 14, 16 should be uniform for the entire length of the conveyors 14, 16 to ensure that the foam layer has a uniform thickness.

As the sandwiched layer of polyurethane foam material travels along the conveyor path between the lower and upper conveyors 14, 16, the foam is cured by means of the heated air introduced into the heat cover 94 by the air heater 98. Curing of the polyurethane foam by heating increases the reaction rate of the reacting polyol and isocyanate components and adds to the dimensional stability of the foam. The temperature within the heat cover 94 should be maintained between approximately 100° to 200° F., with a temperature between about 150° to 160° F. being preferred. Temperatures above 200° F. could possibly melt the low density polyethylene liner sheets 46, 92, thereby damaging the finished padding material, and should therefore be avoided. Typically, a residence time of between 5 to 6 minutes is required within the heat cover 94 to fully cure the polyurethane foam. Preferably, the conveyors 14, 16 and heat cover 94 are of such a length as to provide this residence time under normal conveyor speeds. It should be noted, however, that the polyurethane foam need not be fully cured upon exiting the heat cover. In such cases, the polyurethane foam may be processed and allowed to cure under normal ambient conditions with little, if any, detrimental effect.

As the polyurethane foam is compressed between the lower and upper conveyors 14, 16, the lower and upper liner sheets 46, 92 are pressed against the curing polyurethane foam so that the liner sheets 46, 92 permanently adhere to the polyurethane foam. A preferred liner sheet material for use with the curing polyurethane foam include "SF-22" low density polyethylene film, available from Consolidated Thermoplastics Company, Dallas, Tex.

As the laminated foam exits the rearward end of the conveyors, 14, 16, the edges of the foam laminate are trimmed by means of the trim saws 106. The distance between the trim saws 106 can be adjusted by means of the saw adjusters 110 so that the carpet padding is cut to desired widths. From the trim saws 106, the conveyors 14, 16, continue to feed the foam laminate rearward to the roller table 112 and to the holding stage 114. The holding stage 114 provides an amount of slack as the laminated foam is fed past the counter 118 of the roller table 116 and through the cut-off shear 120 by the motor driven roller 122 for packaging. When the counter 118 counts the preselected number of feet, the motor 126 will be stopped causing the roller 122 to pause momentarily. The shear 120 then cuts the carpet padding to form the finished rolls 125 of carpet padding. The rolls 125 of carpet padding are then removed and empty rollers 122 are replaced so that the process continues.

Figure 4:
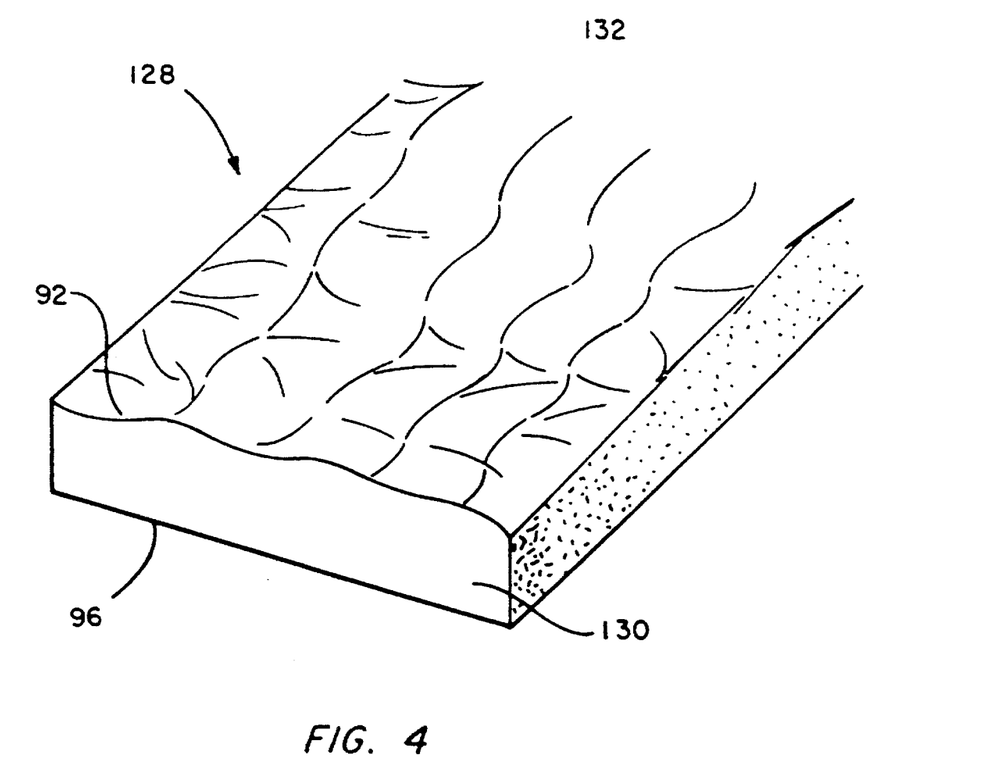
FIG. 4 is a perspective view of a section of padding material constructed in accordance with the method of the invention.

Referring to FIG. 4, a finished section of carpet padding 128 is shown which is constructed in accordance with the method of the invention. The carpet padding 128 has a polyurethane foam inner layer 130 which is surrounded by and bonded to the upper and lower liner sheets 92, 46, respectively. The resulting padding 128 is a double-sided laminate of more sturdy construction than the typical prior art materials, such as re-bond. The surfaces of the carpet padding 128 are imprinted with a chain imprint 132 which creates a decorative appearance. This imprinted pattern is permanently formed on the carpet padding due the pressure exerted by the woven chain-link belts 18 of the conveyors 14, 16 as the polyurethane foam is curing.

The method and apparatus of the invention produce a more durable and aesthetically pleasing carpet pad. The two polyethylene liners on either side of the foam inner layer prevent unraveling or degrading caused by heavy foot traffic which would other wise occur with the re-bond carpet padding. The polyethylene liners also provide a moisture barrier to prevent liquid spilled onto the overlying carpet from penetrating and soaking the polyurethane foam layer. The method of manufacturing the carpet pad is simple and provides a continuous sheet of carpet padding. The liners adhere readily to the polyurethane foam as the foam is curing without the need for applying heat and pressure after the foam has cured, as in prior art methods, so that the integrity of the polyurethane foam is not compromised.

While the invention has been shown in only one of its forms it should be apparent to those skilled in the art that it is not so limited but is susceptible to various changes to that departing from the scope of the invention.

I claim:

1. A method of manufacturing padding material for underlying a carpet floor covering comprising of the steps of:

feeding a first liner sheet having an exposed surface along a conveyor path;

depositing an amount of uncured, resilient polymeric foam material on the exposed surface of the first liner sheet as the first liner sheet is fed along the conveyor path so that the foam material is deposited as a generally uniform layer over the exposed surface of the first liner sheet;

positioning a second liner sheet over the layer of polymeric foam material as the first liner sheet is fed along the conveyor path so that the layer of foam material is sandwiched between the first and second liner sheets;

feeding the sandwiched layer of foam material along the conveyor path between a pair of opposite facing parallel conveyor belts which are spaced apart so that the sandwiched layer of polymeric foam material is compressed to a selected uniform thickness; and then allowing the sandwiched layer of polymeric foam material to at least partly cure as the foam material is compressed between the conveyor belts so that the first and second sheets adhere to the foam material to form a foam laminate, the foam layer of the foam laminate having a density greater than about 2.5 pounds per cubic foot.

2. The method of claim 1, wherein:

the polymeric foam material is a polyurethane open celled foam.

3. The method of claim 1, wherein:

uncured polymeric foam material is deposited by means of a movable spray head assembly which moves at generally right angles in relation to the conveyor path.

4. The method of claim 1, wherein:

at least one of the conveyor belts is a continuous chain-link belt which imprints a corresponding chain-link pattern onto at least one surface of the foam laminate.

5. The method of claim 1, wherein:

the liner sheets are formed from polyethylene.

6. The method of claim 1, wherein:

the liner sheets have a thickness of approximately 0.001 inch.

7. The method of claim 1, wherein:

the foam material is compressed to a density of approximately 6 pounds per cubic foot.

8. The method of claim 1, wherein:

the sandwiched foam material is compressed to a thickness of approximately ½ inch.

9. The method of claim 1, wherein:

the polymeric foam material is cured by heating the foam material as the sandwiched layer is conveyed along the conveyor path between the conveyor belts.

10. The method of claim 9, wherein: heating is accomplished by directing heated air along the conveyor belts while the sandwiched layer is compressed between the conveyor belts along the conveyor path.

11. The method of claim 10, wherein:

the heated air is directed over the sandwiched layer of polymeric material by introducing the heated air into a heat cover which surrounds the conveyor belts along the conveyor path.

12. The method of claim 1, wherein:

the first and second liner sheets each have a length and width; and further comprising cutting the foam laminate into desire dimensions as the laminate is fed from the conveyor belts.

13. A method of manufacturing padding material for underlying a carpet floor covering comprising the steps of:

feeding a first liner sheet having an exposed surface along a conveyor path;

depositing an amount of uncured, resilient polymeric foam material on the exposed surface of the first liner sheet as the first liner sheet is fed along the conveyor path so that the foam material is deposited as a generally uniform layer over the exposed surface of the first liner sheet;

positioning a second liner sheet over the layer of polymeric foam material as the first liner sheet is fed along the conveyor path so that the layer of foam material is sandwiched between the first and second liner sheets;

feeding the sandwiched layer of foam material along the conveyor path between a pair of opposite facing parallel conveyor belts which are spaced apart so that the sandwiched layer of polymeric foam material is compressed to a selected uniform thickness, at least one of the conveyor belts being a continuous chain-link belt; and then heating the sandwiched layer of polymeric foam material as the foam material is compressed between the conveyor belts by directing heated air along the conveyor belts so that the foam material is at least partially cured with the first and second sheets adhering to the foam material to form a foam laminate, the at least one conveyor belt imprinting a corresponding chain-link pattern onto at least one surface of the foam laminate; and wherein the foam layer of the foam laminate has a density after being compressed between the conveyor belts of about 6.0 pounds per cubic foot.

14. The method of claim 13, wherein:

the polymeric foam material is a polyurethane open celled foam.

15. The method of claim 13, wherein:

uncured polymeric foam material is deposited by means of a movable spray head assembly which moves at generally right angles in relation to the conveyor path.

16. The method of claim 13, wherein:

the liner sheets are formed from polyethylene.

17. The method of claim 13, wherein:

the liner sheets have a thickness of approximately 0.001 inch.

18. The method of claim 13 wherein:

the foam material is compressed to a density of approximately 6 pounds per cubic foot.

19. The method of claim 13 wherein:

the sandwiched foam material is compressed to a thickness of approximately ½ inch.

20. The method of claim 13, wherein:

the heated air is directed over the sandwiched layer of polymeric material by introducing the heated air into a heat cover which surrounds the conveyor belts along the conveyor path.

21. The method of claim 13, wherein:

the first and second liner sheets each have a length and a width; and further comprising;

cutting the foam laminate into desired dimensions as the laminate is fed from the conveyor belts.

* * * * *